United States Patent [19]

Christmas et al.

[11] Patent Number: 4,546,468
[45] Date of Patent: Oct. 8, 1985

[54] SWITCHING NETWORK CONTROL CIRCUIT

[75] Inventors: Walter P. Christmas, Arvada; Bruce W. Sanders, Boulder, both of Colo.

[73] Assignee: AT&T Bell Laboratories, Murray Hill, N.J.

[21] Appl. No.: 417,598

[22] Filed: Sep. 13, 1982

[51] Int. Cl.[4] ............................................. H04Q 11/04
[52] U.S. Cl. ........................................ 370/54; 370/58
[58] Field of Search ............................ 370/54, 58, 62; 179/18 ES

[56] References Cited

U.S. PATENT DOCUMENTS

| 3,860,761 | 1/1975 | O'Neill | 370/54 |
| 3,967,072 | 6/1976 | Dimmick et al. | 370/54 |
| 4,280,217 | 7/1981 | Hafer et al. | 179/18 ES |

Primary Examiner—Douglas W. Olms
Attorney, Agent, or Firm—James M. Graziano

[57] ABSTRACT

Electronic business communication systems are generally comprised of a number of independent switching modules each of which is comprised of a time slot interchange circuit. These time slot interchange circuits are all interconnected by a separate central switching network. The subject switching network control arrangement provides a flexible method of interconnecting the subscribers served by the telephone switching system and, in particular, of summing the conversations of various conferees in a conference call situation to thereby minimize the traffic in the central switching network as well as provide various feature enhancements.

10 Claims, 9 Drawing Figures

| |
|---|
| ADD PORT (PT#, CN#, TSI#) |
| DELETE PORT (PT#, CN#, TSI#) |
| ADD TIME SLOT (TSI#, CN#) |
| DELETE TIME SLOT (TSI#, CN#, TS#) |
| QUIET PORT (PT#, CN#, TSI#) |
| ADD LISTEN ONLY PORT (PT#, CN#, TSI#) |

*Fig-5*

| |
|---|
| CREATE GLOBAL CONNECTION (TSI#, TSI#) |
| DELETE GLOBAL CONNECTION (GC#) |
| CREATE LOCAL CONNECTION (TSI#) |
| DELETE LOCAL CONNECTION (LC#) |
| ADD ROOT (TSI#, LC#) |
| UNROOT (R#, TSI#) |
| HANG (TSI#, LC#, LC#) |
| UNHANG (TSI#, LC#) |
| ATTACH (TSI#, LC#, PT#) |
| DETACH (TSI#, LC#, PT#) |
| GET PORT (PT#) |

SWITCHING NETWORK CONTROL CIRCUIT

FIELD OF THE INVENTION

This invention relates to telephone switching systems and, in particular, to a switching network control arrangement which dynamically defines communication connections as a function of the terminal equipment being served and which efficiently implements a distributed conferencing scheme.

DESCRIPTION OF THE PRIOR ART

Traditionally, telephone switching networks simply implement direct connections between two welldefined end points. In a conference call situation, these switching networks individually switch each user associated with the conference to a centrally located conference unit wherein the various conversations carried by each of these individual network connections are summed. This sum is then distributed to all the individual conferees over these same network connections. The difficulty with this arrangement is that there is a switching network connection to the central conference unit for each conferee and, for a large number of conferees, the traffic load placed on the central switching network by these network connections becomes excessive. This situation is further exacerbated in multimodule telephone switching systems where a significant number of intramodule trunks are required to establish these one per conferee network connections to the central conference unit. There typically is a limited number of intramodule trunks available and these are expensive facilities. Thus, many systems limit the size of conferences to avoid this problem.

An exception to this traditional conference call structure is disclosed in U.S. Pat. No. 4,000,377, issued to I. P. Sharret. The Sharret patent discloses a conference arrangement for multimodule telephone switching systems wherein the conversations of all the conferees served by a particular switch module are summed in that module by a "local" conference unit and only the resultant signal is forwarded from each module via intramodule trunks through the central switching network to the central conference unit serving the originating conferee. These resultant signals from all the switching modules are summed therein by a "master" conference circuit. The sum of all these resultant signals is then distributed over these intramodule trunks back to the other switch modules where the sum is decoded and redistributed to all the conferees by the "local" conference units.

These prior art conference call schemes are limited by the switching network architecture which can only implement bidirectional communication connections between two well-defined end points. Thus, prior art conference call arrangements must rely either on a fixed centrally located hardware conference circuit to sum all conversations, or a number of fixed remotely located hardware conference circuits to perform partial sums which are then forwarded to the fixed centrally located "master" hardware conference circuit for final summing. All these prior art conference schemes are rigid hardwired configurations which simply route the conversations of the conferees to an end point summing circuit which sums all the conversations.

SUMMARY OF THE INVENTION

This problem is overcome by the present invention which provides a flexible network control arrangement. Telephone switching systems generally contain a number of independent switch modules, each of which is comprised of a time slot interchange circuit. These time slot interchange circuits are all interconnected by a separate central switching network such as a time multiplex switch. The subject switching network control arrangement provides a flexible method of dynamically controlling the communications connections among the subscribers served by such a telephone switching system and of summing the conversations of various conferees in a conference call situation.

In particular, call processing is implemented in a distributed processing fashion using a layered control structure. The system processor functions on the highest level of this layered control structure, wherein the system features are defined. This segment of the network control arrangement is hardware-independent and only defines relationships among large functional segments of the switching system. The hardware-dependent segment of this network control arrangement consists of a programmable central connection manager which dynamically defines the necessary switch module interconnections and time slot interchange circuit summing schemes to interconnect the user's terminal equipment in any desired arrangement.

This network control arrangement is implemented by a number of independent processor-controlled modules, each of which operates on a predetermined layer of the call processing software. These independent modules are interconnected by a system of busses and communication among the modules is accomplished by a module generating an interrupt to alert the destination module of the presence of a message.

In this distributed processing environment, both unidirectional and bidirectional communication paths may be established so that, on a conference call, conferees may be added in a "listen only" mode or consultation groups may be established wherein the consultation group is temporarily connected to the rest of the conference in a listen only mode while all the conferees in the consultation group can freely converse in complete privacy. The conference call feature as implemented by the switching network control arrangement of our invention also radically departs from the traditional form of conferencing by eliminating the "master" conference circuit and instead dynamically performing various combinations of conversations in any convenient switch module, then selectively interconnecting these switch modules to "share" the data with the other switch modules as needed.

The programmable nature of this switching network control arrangement allows the user or system programmer complete flexibility to configure any communication connection or conference arrangement that is desired. Privacy, listen only connections, and consultation groups are just a few of the capabilities inherent in this system structure. In addition, the modular nature of the network control arrangement provides flexibility by insulating the various layers of the call processing software from each other. A particular segment of the network control arrangement can be modified without affecting the remaining segments as long as the message structure between segments remains unchanged. This modularity also provides portability of the software to any other similar system.

DETAILED DESCRIPTION OF THE DRAWINGS

Figure 1:
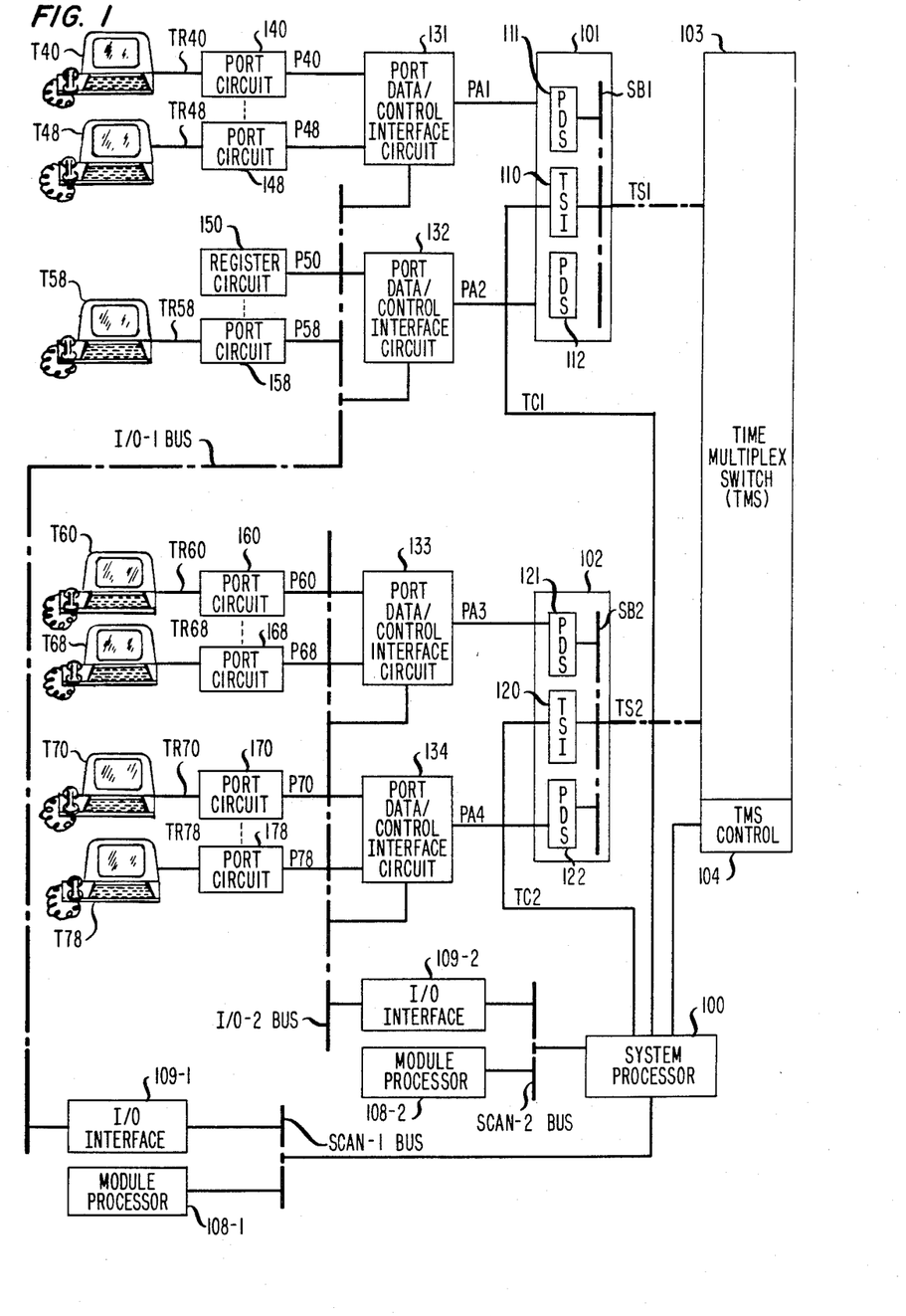
FIG. 1 illustrates the subject telephone switching system in block diagram form.

The telephone switching system of our invention is shown in FIG. 1. This system includes a plurality of terminal equipment T40-T78 each of which is associated with a respective one of port circuits 140-178. This terminal equipment includes telephone station sets as well as digital terminal devices. A two-stage time division switching network which comprises time slot interchange circuits 101, 102 and time multiplex switch 103 establishes communications connections among port circuits 140-178. The first stage of the telephone switching network comprises a plurality of time slot interchange circuits (two of which are shown on FIG. 5—101, 102) of the type illustrated in U.S. Pat. No. 4,112,258. The operation of each time slot interchange circuit 101, 102 is regulated by an associated control circuit called time slot interchanger (TSI) 110, 120 which functions to effect a non-blocking type of switching operation between any two port circuits connected to time slot interchange circuit 101, 102 and to also effect selectable additional signal processing, such as: inserting customized gain, signal summing, signal multiplexing. In many cases, connections between port circuits served by different time slot interchange circuits are desired. Thus, if terminal equipment T40 is to be connected to terminal equipment T70, the associated time slot interchange circuits 101, 102 must be interconnected. Time multiplex switch 103 performs this interconnection function and acts under control of time multiplex switch control circuit 104 as the second stage of switching in the telephone switching network.

Each port data/control interface circuit (ex. 131) serves eight port circuits (140-148) and functions to interface these port circuits with the associated time slot interchange circuit 101 as well as the system processor 100 via I/0 interface 109-1 which serves port data/control interface circuit 131. In this system, each time slot interchange circuit (ex. 101) has associated therewith a control module consisting of module processor 108-1 and I/0 interface 109-1, which serves to perform many of the hardware-oriented and real-time intensive tasks such as circuit scanning. This control module thereby deloads system processor 100 and also functions to insulate system processor 100 from the hardware details of the circuits served by the system.

Message Format

Figure 3:
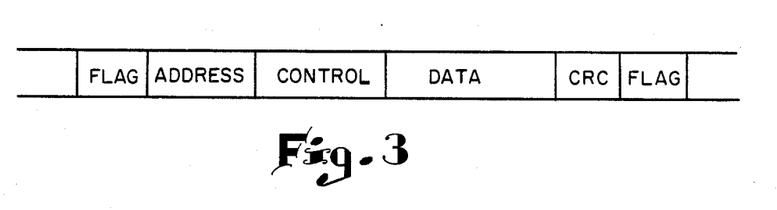
FIGS. 3 and 4 illustrate the format of typical data messages.

The terminal equipment served by the telephone switching system may be various types of equipment and the equipment illustrated in FIG. 1 has concurrent voice and data transmission capability. In this system, all the terminal equipment which receive voice transmissions from the user, convert the received analog voice signals into a set of digital data segments, each comprising an eight bit PCM-encoded voice sample. The terminal equipment which serves or generates digital transmissions (such as keyboards) receive or originate digital data messages which are generally of length greater than eight bits. The typical format of these data messages is illustrated in FIG. 3, wherein each data message includes flag bits at the beginning and end of the data message; data, control and address fields; and a cyclic redundancy check field for error checking purposes. The terminal equipment illustrated in FIG. 1 divides up this data message and transmits same to the telephone switching system in eight bit data segments. Thus, all data segments generated by all terminal equipment are eight bits long. For the terminal equipment having concurrent voice and data capability, both eight bit PCM-encoded voice samples and eight bit data segments must be concurrently transmitted.

Figure 4:
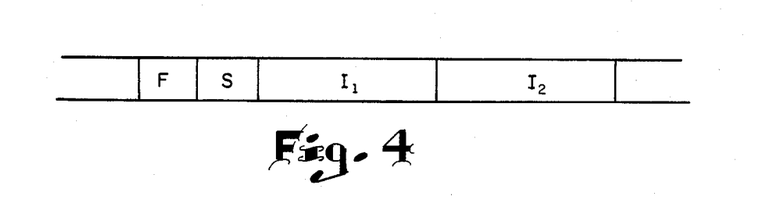

A particular message segment format is used in this system which enables concurrent voice and data transmission. This format is illustrated in FIG. 4. Each message segment consists of a framing bit and three fields: a control or S field, and two data or Information (I) fields. This is a well-known data transmission format wherein one of the data fields can be used for the transmission of voice information while the other data field (or both data fields) can be used for the transmission of either bulk or interactive data. Thus, in the system of the present disclosure, assume that the voice-only terminal equipment only place the eight bit PCM-encoded voice samples in the first I field ($I_1$) of each message segment; data-only terminal equipment only place the eight bit data segments in the second I field ($I_2$) of each message segment; while the combined voice and data terminal equipment use both I fields, placing the eight bit PCM-encoded voice samples in field ($I_1$) and the eight bit data segments in field ($I_2$) of each message segment. Thus, all the signals transmitted to the telephone switching system from the terminal equipment are in the format illustrated in FIG. 4.

Establishing a Communication Connection

Figure 2:
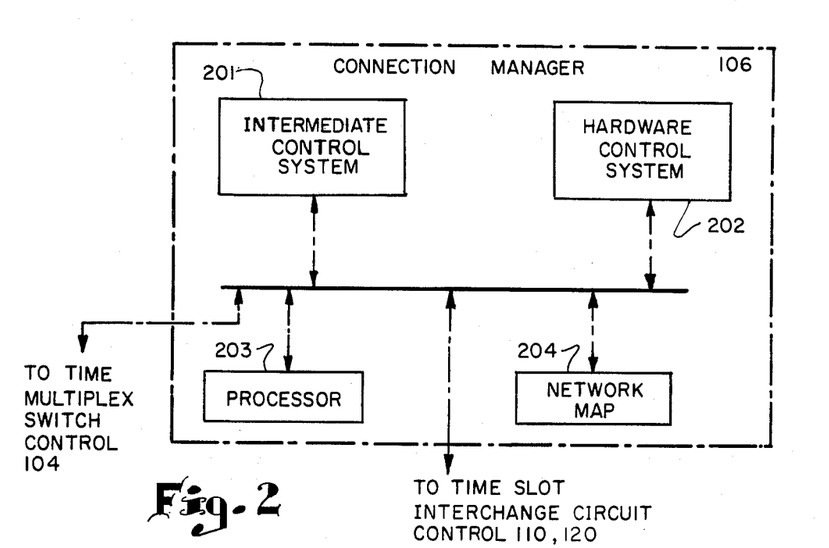
FIG. 2 illustrates the connection manager in block diagram form.

To better understand the operation of this telephone switching system, it is necessary to introduce the concept of the connection manager. FIG. 2 illustrates in block diagram form the basic structure of connection manager 106. This is a processor-based control arrangement which realizes the switching network control, as is described below.

In this telephone switching system, call processing is implemented in a distributed processing fashion using layered software. System processor 100 functions on the highest level of this layered software, wherein the system features are defined. This layer of the software only defines relationships among large functional segments of the system. For example, on a call origination, a service request is made to the system by the user at a piece of terminal equipment (ex. T40) going off-hook. System processor 100 interprets this off-hook situation in view of the status of terminal equipment T40 (idle) and determines that terminal equipment T40 is thereby requesting a dial tone connection. System processor 100 generates a list of the necessary digital call signal exchanges, creates a set or list of instructions called operation requests to implement these exchanges and relays this list of operation requests to connection manager 106. These operation requests define the interconnection of system elements necessary (or at least as perceived by system processor 100) to satisfy the received service request. In the case mentioned, the operation requests would indicate the connection of terminal equipment T40 via its associated port circuit 140 to an idle digit register circuit (ex. 150) through the serving time slot interchange circuit 101. Connection manager 106 analyzes each operation request received from system processor 100 and converts each such generalized request into the actual hardware action necessary to implement the communication connection. Connection manager 106 accomplishes this resource allocation by transmitting connection control information to time multiplex switch control circuit 104 and to time slot interchange control circuits 110, 120, which control circuits activate their associated switching network elements. Thus, system processor 100 deals with abstractions, or system level definitions while connection manager 106 handles the actual hardware details. This insulates system processor 100 from hardware changes in the system while also deloading system processor 100 of the mundane time consuming chores such as circuit scanning and network control.

Intermediate and Hardware Control Systems

Connection manager 106 of FIG. 1 is a processor-based control circuit which is used to determine how a request for service will be realized by the elements of the telephone system it serves. One segment of connection manager 106 converts an operation request to an actual subsystem realization, and is known as an Intermediate Control System (ICS) 201 and it will be so designated for the rest of this description. Another segment of connection manager 106 translates the intermediate control system outputs to the actual hardware operation and is known as a Hardware Control System 202. The Intermediate Control System and Hardware Control System may be embodied by any one of a number of means and, as described, each is realized by a set of program instructions which are stored in read-only memory (ROM) or a programmable read-only memory (PROM) which program instructions are executed by an associated processor circuit.

As mentioned above, connection manager 106 is a processor-based control circuit and a generalized schematic of this circuit is shown in FIG. 2. Processor 203 is the controlling element and operates in response to instructions from intermediate control system 201, hardware control system 202 and data from network map 204. Intermediate control system 201 consists of a memory illustrated in FIG. 5 which is partitioned into a number of logical segments. Each such segment is made up of program instructions in the form of binary digits (bits) so arranged that they are recognized by processor 203 as commands to take action. Hardware control system 202 also consists of a memory illustrated in FIG. 6 which also is partitioned into a number of logical segments. Each such logical segment is comprised of program instructions which translate commands into data which identifies the circuit elements necessary to complete the requested action. Network map 204 is a portion of the memory illustrated in FIG. 7 wherein is stored a listing of the actual circuit elements utilized to implement a particular communication connection.

Processor 203 calls appropriate logical segments of intermediate control system 201 in response to higher level commands either from system processor 100 or the operating system resident in processor 203. Processor 203 then uses these logical segments in an order determined by its call processing software to interpret the high level commands received from system processor 100, and determine which logical segments of hardware control system 202 are necessary to define the circuit elements necessary to implement the required switching network connections. Processor 203 then accesses the identified logical segments of hardware control system 202 in a predetermined order to obtain circuit element data from these logical segments. Processor 203 then writes the resulting switching network configuration into its network map 204 portion of memory.

While FIG. 2 illustrates the basic conceptual configuration of connection manager 106, the actual system implementation makes use of the benefits of distributed processing. In particular, a segment of processor 203, all of intermediate control system 201 and part of network map 204 are realized by a plurality of module processors (108-1 to 108-2) and their associated memories (107-1 to 107-2). Similarly, the remaining segment of processor 203, all of hardware control system 202 and part of network map 204 are realized by TSI 110, 120 and time multiplex switch control circuit 104. Thus, system processor 100 still generates high level commands, which commands are acted upon by connection manager 106 which comprises: a plurality of modularized control circuits (107-1, 108-1, 110; 107-2, 108-2, 120) organized on a time slot interchange circuit basis; a plurality of processor-based time slot interchange control circuits 110, 120 and a processor-based time multiplex switch control circuit 104.

Call Processing

The operation of this system will be illustrated by describing the processing of various calls. Module processors 108-1, 108-2 control the scanning of port circuits 140-178 as well as the operation of time slot interchange circuit 101, 102 and time multiplex switch 103. In particular, module processor 108-1 generates a scan frame rate such that each port, trunk and service circuit connected to the associated time slot interchange circuit (101) is scanned once during each network scan cycle. Module processor 108-1 accomplishes this scanning by transmitting timing, address and control information to I/0 interface 109-1 via SCAN-1 BUS. I/0 interface 109-1 then transmits these signals via I/0 BUS to port data/control interface circuit 131. Each port data/control interface circuit (ex. 131) interprets the signals received on I/0 BUS-1 during each scan frame and determines whether the address signals transmitted thereon identify one of the port circuits (eg. 140) served by that port data/control interface circuit (131). If such a match occurs during a scan frame, port data/control interface circuit 131 enables the identified port circuit 140 during the first half of the scan frame which, in turn, reads the data (via leads P40) being transmitted to port data/control interface circuit 131 by module processor 108-1. Port circuit 140 is responsive to this control data for controlling the operation of the associated terminal equipment T40. This is accomplished by port circuit 140 transmitting control segments which indicate the desired operation to terminal equipment T40 in the S field of the message segment illustrated in FIG. 4. Terminal equipment T40 responds to these control segments by performing the indicated operation, such as lighting a lamp, producing an audible ring signal, etc. During the second half of the scan cycle, port circuit 140 transmits control data, which has been received from terminal equipment T40 as control segments in the S field of the message segments illustrated in FIG. 4, to module processor 108-1. These control data transmissions from port circuit 140 are received by port data/control interface circuit 131 and forwarded via I/0-1 BUS to I/0 interface 109-1, which, in turn, transmits the control data to module processor 108-1 via SCAN-1 BUS. In this fashion, control data is exchanged between terminal equipment T40-T78 and module processor 108-1.

Module processor 108-1 responds to this control data by creating a control message (containing this control data) to be transmitted to system processor 100. The transmission is accomplished by module processor 108-1 generating an interrupt which is transmitted to system processor 100 via SCAN-1 BUS. System processor 100 responds to the interrupt by reading the control message from module processor 108-1. Thus, the control data generated by the terminal equipment is first handled by the module processor, then relayed to system processor 100.

Figure 9:
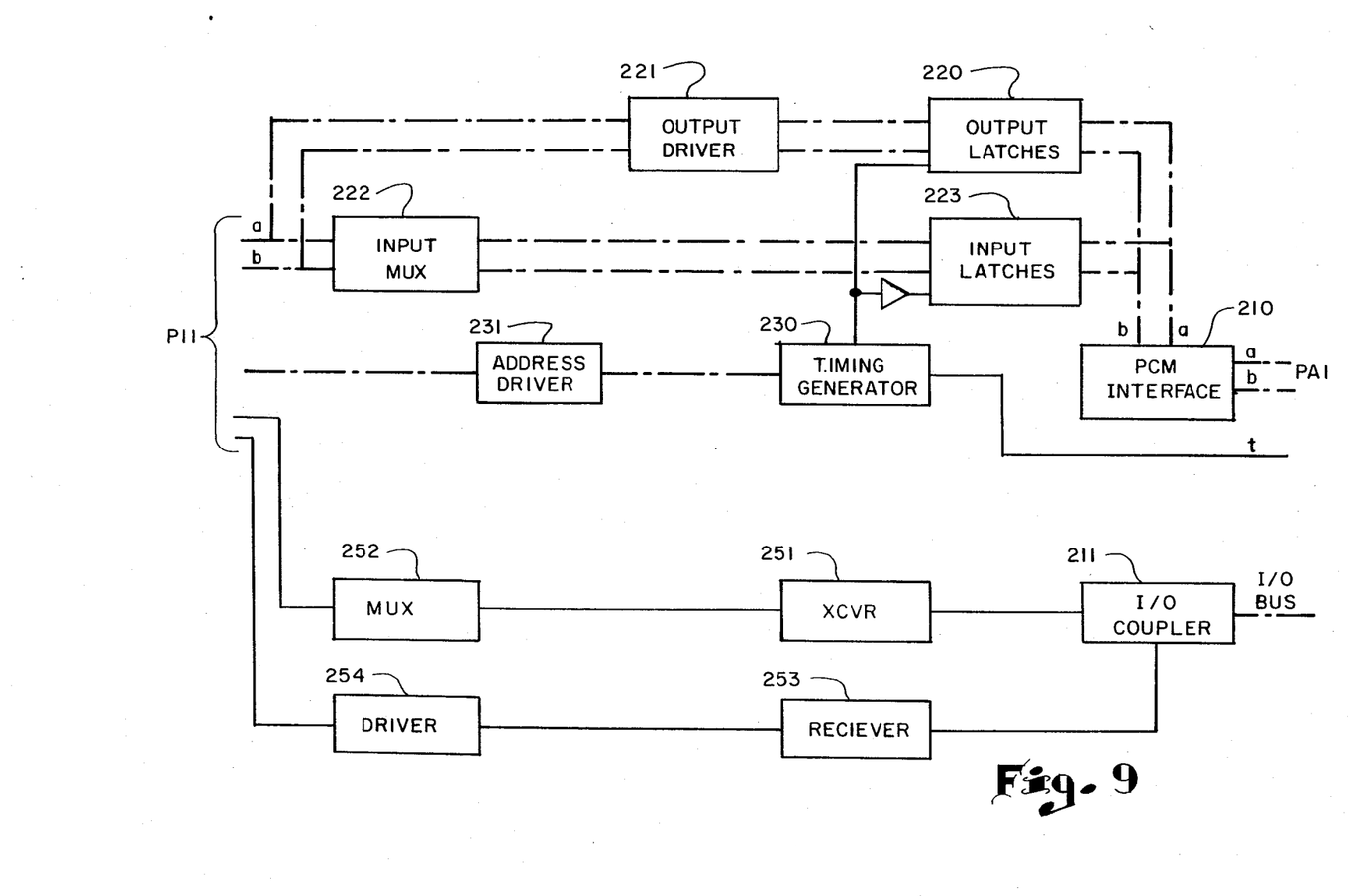
FIG. 9 illustrates the port data/control interface circuit.

The digital call signals (data and PCM-encoded voice transmissions) from terminal equipment T40-T78 are controlled by time slot interchange circuits 101, 102. In particular, these transmissions from a piece of terminal equipment (ex. T40) are stored in the associated port circuit 140 until retrieved by time slot interchange circuit 101 via port data/control interface circuit 131, which serves port circuit 140. In particular, assume that a user at terminal equipment T40 wishes to establish a voice connection through the telephone switching system to the user at terminal equipment T58. The user at terminal equipment T40 goes off-hook, and terminal equipment T40 generates a request for service. This is accomplished by terminal equipment T40 transmitting a control segment which indicates an off-hook in the S field of the message segment (as illustrated in FIG. 4) to port circuit 140 during the scan frame associated with port circuit 140. Since this is the call setup phase of the call, the I fields will not contain any data. This control segment contains a coded message representing an off-hook indication and port circuit 140, when scanned as described above, relays this control data to port data/control interface circuit 131 via leads P40. Port data/control interface circuit 131 relays this control data via I/0-1 BUS, I/0 interface 109-1 and SCAN-1 BUS to module processor 108-1. The circuitry of port data/control interface circuit 131 which accomplishes this control data transfer is illustrated in FIG. 9. In particular, the portion of port data/control interface circuit 131 which processes this control data comprises I/0 coupler 211, transceiver (XCVR) 251, multiplexer 252, receiver 253, and driver 254. I/0 coupler 211 receives the control data transmitted from module processor 108-1 via SCAN-1 BUS through I/0 interface 109 and I/0-1 BUS and removes the timing and address information from the control data. This timing and address information is switched by receiver 253 and driver 254 to enable port circuit 140 via leads P40. I/0 coupler 211 concurrently transmits the remainder of the control data to port circuit 140 via transceiver 251 and multiplexor 252 during the first half of the scan frame and receives control data from port circuit 140 over the same path in the reverse direction during the second half of the scan frame.

In order to assist the reader in understanding the operation of this system, the basic operation of the the time slot interchange circuits 101, 102, port circuits 140,178 and port data/control interface circuits 131,134 will be discussed. The role of connection manager 106 in controlling these circuits will not be discussed in detail until after the basic switching network operation is discussed.

Each piece of terminal equipment (ex. T40) is assigned a pair of memory locations in the port data store 111 serving that terminal equipment T40. One of these memory locations is for storing digital call signals transmitted from terminal equipment T40 to TSI 110 while the other memory location is for storing digital call signals transmitted to terminal equipment T40 by TSI 110. When the network time slot assigned to a communication connection which includes terminal equipment T40 is reached, the transmissions from all the circuits assigned to this communication connection are interchanged. In particular, during the first half of the network time slot, time slot interchanger (TSI) 110 reads out the eight bit PCM-encoded voice sample from the memory location in port data store 111 associated with transmissions from terminal equipment T40 to TSI 110 and writes same via bus SB1 into the memory location in port data store 112 associated with transmissions to terminal equipment T58 from TSI 110. During the second half of the network time slot, TSI 110 reads out the eight bit PCM-encoded voice sample from the memory location in port data store 112 associated with transmissions from terminal equipment T58 to TSI 110 and writes same via bus SB1 in the memory location in port data store 110 associated with transmissions from TSI 111 to terminal equipment T40.

These exchanged transmissions remain in their respective port data stores and each transmission is forwarded to the associated terminal equipment during the first half of the scan frame assigned to that piece of terminal equipment. This is accomplished by time slot interchange circuit 101 enabling (for example) the memory location in port data store 111 associated with transmissions to terminal equipment T40 from TSI 110. Simultaneously, port data/control interface circuit 131 reads out the data stored in this memory location and transmits same to port circuit 140 which has been concurrently addressed by port data/control interface circuit 131. During the second half of this scan frame, port data/control interface circuit 131 receives transmissions from port circuit 140 and writes same into the now enabled memory location in port data store 111 associated with transmissions from terminal equipment T40 to TSI 110. In the call being discussed, digit register circuit 150 outputs a data transmission (eight bit PCM-encoded dial tone) which is stored in the aforementioned memory location in port data store 112 assigned to transmissions from digit register circuit 150 to TSI 110. When the network time slot allocated to this communication connection is reached, time slot interchanger (TSI) 110 reads out this data transmission from the memory location in port data store 112 associated with transmissions from digit register circuit 150 to TSI 110 via SB1 BUS and writes this data transmission into the memory location in port data store 111 assigned to transmissions from TSI 110 to terminal equipment T40. Since, in this example, terminal equipment T40 has not produced a transmission, there is no data transfer in the reverse direction. This transferred data transmission remains in port data store 111 until the clock portion of module processor 108-1 reaches the scan frame assigned to terminal equipment T40, at which time port data/- control interface circuit 131 enables port circuit 140 as described above and reads the data transmission out of the aforementioned memory location in port data store 111, which memory location is simultaneously addressed by TSI 110. Port data/control interface circuit 131 transfers the data transmission from the enabled memory location in port data store 111 to port circuit 140, which outputs the eight bit PCM-encoded dial tone to terminal equipment T40 via field $I_1$, in the message segment transmitted on leads T40.

Call Dialing

Thus, the user at terminal equipment T40 receives dial tone, and then dials the station number of terminal equipment T58. The dial pulses or tones so generated are encoded into eight bit PCM samples by terminal equipment T40 and transmitted to the telephone switching system where they are switched by time slot interchange circuit 101 to digit register circuit 150 in the manner outlined above. When dialing is completed, module processor 108-1 reads out the dialed number from digit register circuit 150 via I/0-1 BUS, I/0 interface 109-1 and SCAN-1 BUS. Module processor 108-1 transmits the dialed number to system processor 100 which decodes the dialed number to determine the destination of this call. In doing so, terminal equipment T58 is identified as the destination terminal equipment and system processor 100 signals terminal equipment T58 by activating port data/control interface circuit 132 with a ringing control message transmitted via module processor 108-1, SCAN-1 BUS, I/0 interface 109-1 and I/0-1 BUS. Port data/control interface circuit 132 responds to the ringing control message by applying an alerting signal to terminal equipment T58 via port circuit 158 and communication leads TR58. The user at terminal equipment T58 goes off-hook in response to the alerting signal and is cut through to terminal equipment T40 via the network time slot assigned to this communication connection by system processor 100 signalling time slot interchange circuit 101 via module processor 108-1 to substitute terminal equipment T58 for digit register circuit 150 on this communication connection.

Message Segments

Figure 8:
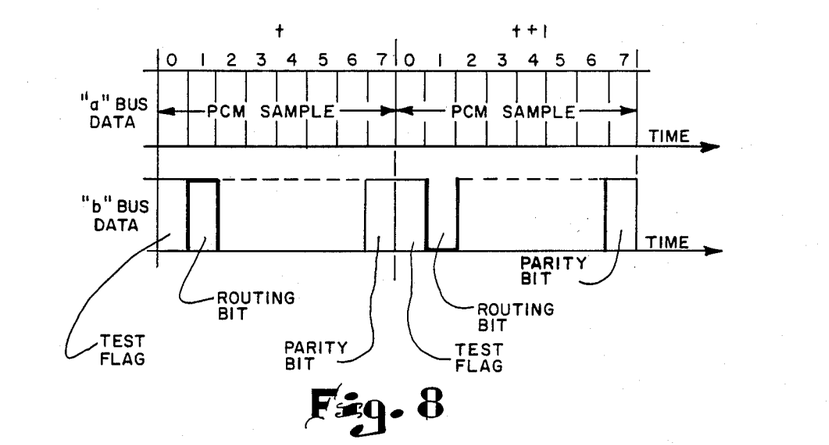
FIG. 8 illustrates the format of the PCM encoded voice signals and control messages.

To further describe the processing of voice and data transmissions, the voice or data segment of the message segment must be described in further detail. In particular, port data/control interface circuit 131 (illustrated in FIG. 9) contains two signal paths, "a" bus and "b" bus. The timing diagram of FIG. 8 illustrates the signals which appear on these signal paths for scan frames t and t+1. The "a" bus carries the eight bit PCM-encoded voice sample (or the eight bit data segment) while the "b" bus carries the eight bit control segment (mentioned above) which is associated with the eight bit PCM-encoded voice sample. As shown in FIG. 8, the eight bit control segment includes a number of signal fields, such as test flag, parity, and routing bit. The timing for these various fields on both "a" and "b" bus are created by time slot interchange circuit 101 and the port data/control interface circuits 131-132 and port circuits 140-158 read/write information out of/into these fields as the voice and control segments are transmitted between the port circuits 140-158 and time slot interchange circuit 101.

Port data/control interface circuit 131 receives "a" bus, "b" bus and timing signals from time slot interchange circuit 101. The module clock (not shown) of time slot interchange circuit 101 transmits clock and address information to all port data/control interface circuits 131-132 via bus t and timing generator 230 contained therein decodes this information into a port address which is applied by address driver 231 to leads P11 to enable the selected port circuit (140). Timing generator 230 simultaneously produces clock signals to enable output latches 220 during the first half of the scan frame and input latches during the second half of the scan frame. Thus, during the first half of the scan frame associated with port circuit 140, port data store 111 transmits a pair of eight bit data and control segments (from the memory location in port data store 111 associated with transmissions from TSI 110 to terminal equipment T40) via "a" and "b" busses and PCM interrace 210 to enabled output latches 220, where these segments are used to drive output driver 221 and thereby transmit the data and control segments to port circuit 140. Transmissions in the reverse direction occur during the second half of the scan frame via input multiplexor 222, input latches 223 and PCM interface 210 of port data/control interface circuit 131. This information is then transmitted by processor 203 to time slot interchanger control circuits 110, 120 and time multiplex switch control circuit 104 to activate the various stages of the switching network to implement this network configuration.

Thus, the fundamental operation of the telephone switching system has been described and we must now concentrate on the function of connection manager 106. In a time division telephone switching system of the type illustrated in FIG. 1, voice communications connections between telephone station sets are transmitted in digital form. All transmission on these connections involve the routing of digital call signals (eight bit data segments) which represent the PCM-encoded speech of the subscribers at the telephone station sets. These data segments are transmitted from source terminal equipment to destination terminal equipment which reads a received data segment and interprets the data contained therein as a signal level which is one eight bit PCM-encoded segment of the transmitted analog waveform. To connect more than two pieces of terminal equipment together in such a system, the data segments must be sent to a conference device that sums their data content. This conference device then takes the resultant sum and, for each connected piece of terminal equipment, subtracts its contribution to the sum then relays the resulting data segment to the connected terminal equipment for interpretation.

Example Conference

Figure 5:
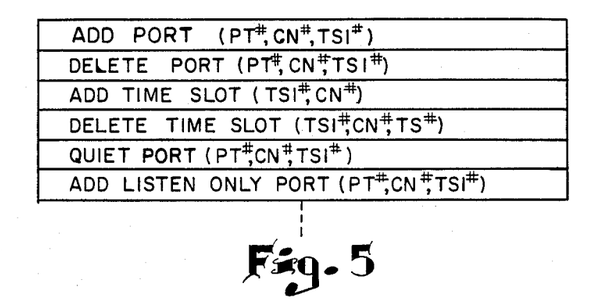
FIGS. 5, 6 and 7 illustrate a partial memory map of the connection manager memory.
Figure 6:
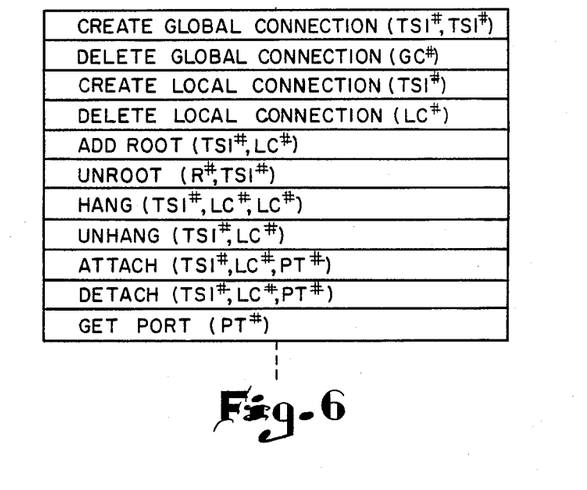

Assume that a user lifts the handset of terminal equipment T40 from its cradle. The action is sensed by port circuit 140 which relays information concerning the status of terminal equipment T40 to module processor 108-1. Data about this action are, as for all such events on the line, relayed by module processor 108-1 to system processor 100 wherein the call processing (feature) software resides. System processor 100 interprets a request for service based upon the particular feature or service which has been activated and generates an appropriate set of operation requests which are relayed to connection manager 106. In this case, system processor 100 would generate a set of operation requests to provide a connection of port circuit 140 to an idle digit register circuit (ex. 150) via a time slot in time slot interchange circuit 101. System processor 100 transmits these operation requests to connection manager 106. In particular, system processor 100 generates an interrupt on SCAN-1 BUS which causes module processor 108-1 to stop whatever task is presently being performed. System processor 100 transmits the operation requests immediately after the interrupt and module processor 108-1 responds to these operation requests by accessing intermediate control system 201. In this system, intermediate control system is a series of logical segments or routines stored in the module processor memory 107-1 and each operation request from system processor 100 is treated by module processor 108-1 as an op code which accesses one of these routines. The received operation requests are to get a connection through time slot interchange circuit 101 to an idle digit register circuit 150 and includes the port numbers (140, 150) of the involved terminal equipment T40 and digit register. The first operation request identifies a logical segment of intermediate control system 201 which is illustrated in FIG. 5 as ADD PORT. The ADD PORT segment is a set of program instructions stored in intermediate control system 201 which takes the variables passed to it (PT#, CN#, TSI#) and determines what action should be taken. In this case the port number (PT#) is 140, time slot interchange (TSI#) is 0 and there is no connection number (CN#) since there is no existing connection. Module processor 108-1 executes the ADD PORT routine of intermediate control system 201 (module processor memory 107-1) which analyzes the network connection map stored in network map 204 and determines what actions need to be taken to achieve the requested operation. In this case, the execution of the ADD PORT routing of intermediate control system 201 returns three actions for module processor 108-1 to implement by means of logical segments of hardware control system 202 (which segments are illustrated in FIG. 6). The first segment is "create a local connection", which, qualified by the time slot interchanger number (0), is a routine to reserve a local connection (ex. LC2) on time slot interchanger 101. The second segment is "get port" which, qualified by the number of the initiating port circuit (140), is a routine which assigns port circuit 140 to the local connection (LC2) just created in time slot interchange circuit 101. The third segment is "attach" which routine calls for port circuit 110 and local connection LC2 to be connected and assigned a status (which was specified by the user of port circuit 140 and which, defines the attributes of port circuit 140 (ex: port circuit 140 is a listen only port). Time slot interchange control circuit (TSI) 110 is a processor-based control circuit having an associated memory and, in this system, realizes hardware control system 202 as well as some of the processing capability of processor 203 of FIG. 2. Time slot interchange circuit 110 sequences through these three identified logical segments of hardware control system 202 and executes the routines that comprise these segments.

Once execution of these routines is completed module processor 108-1 accesses the second operation request which again identifies the ADD PORT segment of intermediate control system 201. The variables passed to the ADD PORT segment now are port number 150 (the digit register circuit), time slot interchange circuit 0 and the connection number LC2 just assigned to the previous connection to which port circuit 140 has just been connected. As just described, module processor 108-1 identifies the same above-identified logical segments as were used to connect port circuit 140. Time slot interchange control circuit 110 sequences through these three identified logical segments of hardware control system 202 and executes the routines that comprise these segments.

Network Map

Figure 7:
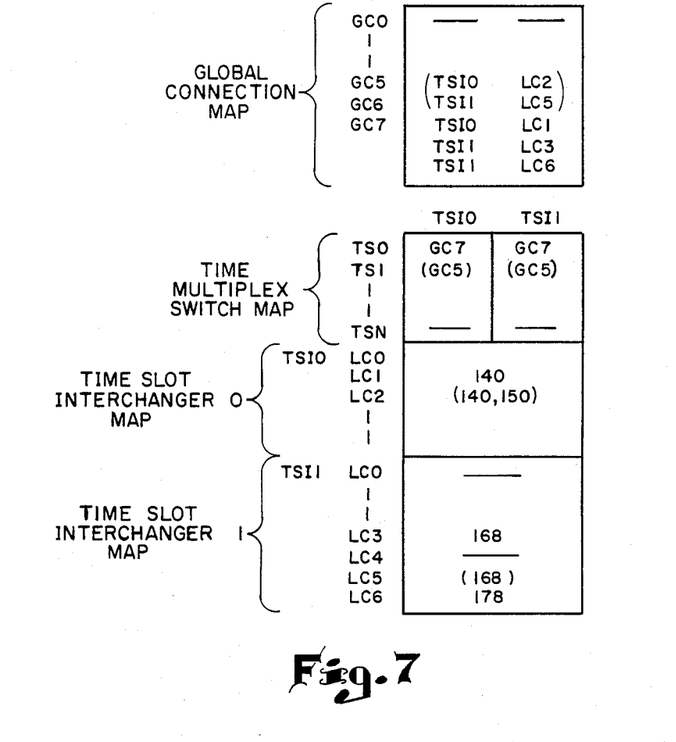

The result of the execution of these six routines is that hardware and connection identifiers are generated. These identifiers are stored by microprocessor 203 in network map 204 (FIG. 7). In particular, network map 204 may be centrally located in connection manager 106 or may be distributed among time multiplex switch control circuit 104, the time slot interchange control circuits and module processor memories 107-1, 107-2. In the disclosed system, network map 204 is divided into a plurality of segments with each segment representing a correspondence between various portions of a switching network connection. The "global connection map" segment is stored in time multiplex switch control circuit 104 and is addressed by a global connection number and has stored therein the identity of the time slot interchangers and their local connections which are interconnected by a connection through time multiplex switch 103. The segment labeled "time multiplex switch map" is stored in time multiplex switch control circuit 104 and indicates the assignment of these global connections to actual time slots in time multiplex switch 103. Thus, the memory location addresses are the time slot numbers and the data in each memory location indicates the global connection being implemented by that time slot in time multiplex switch 103. Finally, the "time slot interchanger maps" are stored in the respective module processor memories 107-1, 107-2 to provide the correspondence between a local connection on a time slot interchanger and the port served by that connection. Thus, for the connection just implemented, module processor 108-1 would enter the port circuit numbers (140, 150) into the memory location corresponding to the local connection LC2 on time slot interchange circuit 101, and this is illustrated in FIG. 7 by the entries 140, 150 in memory location TSIO LC2. (To avoid confusion, the data entries associated with the two party call being described and illustrated in FIG. 7 are delimited by parenthesis while the other data entries which are not delimited by parenthesis are associated with a three-party call described hereinbelow.)

Call Completion

The status of the call is now that terminal equipment T40 is connected by time slot interchange circuit 101 to digit register circuit 150 via local connection LC2 in time slot interchange circuit 101. As described above, digit register circuit 150 returns PCM-encoded dial tone to terminal equipment T40 via this communication connection.

Assume that the user at terminal equipment T40 now dials for a connection to terminal equipment T68. Digit register circuit 150 received the dialed number from terminal equipment T40 and system processor 100 detects the dialed number in the fashion described above. System processor 100 must now act on this information to serve terminal equipment T40. In particular, system processor 100 generates a set of operation requests in response to the service request which, in this case, entails deleting digit register circuit 150 and adding port circuit 168 to the existing connection LC2. Module processor 108-1 responds to the operation requests by first accessing the logical segment of intermediate control system 201 which corresponds to the DELETE PORT routine. The variables passed to the DELETE PORT routine are the port circuit number 150, the time slot interchange circuit number 0, and the local connection number LC2. The DELETE PORT routine determines from these variables that digit register circuit 150 is to be disconnected from this existing connection and in executing the DELETE PORT routine returns the unhang action. Time slot interchange control circuit 110 executes the unhang routine of hardware control system 202 and generates a new set of data to be written in network map 204. Module processor 108-1 next responds to the second of the set of operation requests by accessing the ADD PORT routine in intermediate control system 201 to reserve a connection to terminal equipment T68 via port circuit 168. This operation request is qualified by the port number (168), time slot interchanger number (1) and connection number (LC2). (This time intermediate control system 201 identifies the existing connection to port circuit 140 described above.) The execution of the ADD PORT routine of intermediate control system 201 returns four actions for microprocessor 203 to implement by means of logical segments of hardware control systems 202. The first segment is "create connection" which, qualified by two time slot interchanger numbers (0, 1), is a routine to reserve a time slot connection (ex. TS1) and a path through time multiplex switch 103 for the two time slot interchangers 101, 102 to be connected. The second segment is "add root", a routine that defines the calling local connection LC2 (assigned to port 140) as the foundation of the new global connection GC5 through time multiplex switch 103. This ADD ROOT routine, qualified by the local connection number LC2 in time slot interchanger 102 and global connection number GC5 through time multiplex switch 103 (both just assigned), directs microprocessor 203 to refer all subsequent connections to this call (which call is assigned to port circuit 140) via the global connection GC5 through time multiplex switch 103. The third segment is, the routine "create local connection" which is used again, this time qualified by time slot interchanger number 1 to get a local connection (ex. LC5) on time slot interchanger 102. The fourth segment is the routine "get port" which, qualified by port circuit number 168, assigns port circuit 168 to the local connection LC5 just created on time slot interchanger 102. The execution of these logical segments of hardware control system 202 by microprocessor 203 returns the hardware and connection identifiers GC5, TSI1, LC5, PT 168 which identifiers are stored by microprocessor 203 in network map 204 as illustrated in FIG. 7 and as described above.

Network Cut Through

Thus, a switching network connection is implemented from terminal equipment T40, through port circuit 140, time slot interchange circuit 101 (via local connection LC2), time multiplex switch 103 (via global connection GC5) and time slot interchange circuit 102 (via local connection LC5). Port circuit 168 is not yet connected to this switching network connection since port circuit 168 is now applying ringing to terminal equipment T68. When terminal equipment T68 is taken off hook by a user, this action is sensed by port circuit 168, which removes the ringing signal from terminal equipment T68. Module processor 108-1 detects the change in the busy/idle status of port circuit 168 and relays this information to system processor 100, which responds by transmitting an operation request to connection manager 106. This operation request is to add terminal equipment T68 via port circuit 168 to the existing switching network connection. Processor 203 (module processor 108-1) responds to this operation request by accessing the ADD PORT logical segment of intermediate control system 201 module processor memory circuit 107-1 to add port circuit 168 to the local connection LC5 just reserved in time slot interchange circuit 102. The execution of the ADD PORT routine of intermediate control system (201) causes module processor 108-1 to branch to the "attach" segment of hardware control system 202. The execution of this segment produces identifiers which cause port circuit 168 and its local connection LC5 in time slot interchange circuit 102 to be connected to the existing global connection GC5 and to be assigned a status (which is stored elsewhere in connection manager 106). Thus, terminal equipment T40 (the root connection) may be used to call any number of users at time slot interchanger circuits other than time slot interchange circuit 101 by means of the process described above. All such new local connections will typically be added to the existing global connection through time multiplex switch 103.

Third Party Consultation

Assume now that the user at called terminal equipment T68 desires to add a third user at terminal equipment T78 into the conversation with the user at terminal equipment T40 (the root of the established global connection GC5). Typically, this is accomplished by the user at terminal equipment T68 flashing the switchhook, receiving dial tone and dialing the number of terminal equipment T78. The switchhook flash is again sensed by port circuit 168, communicated to module processor 108-1 and acted upon by the feature/service software in system processor 100.

In this situation, system processor 100 analyzes the call situation (switchhook flash on an existing call) and determines that the switchhook flash is a request for call transfer. In response to this service request, a digit register circuit (150) is connected to port circuit 168 and the dialed information retrieved by system processor 100 as described above. Call transfer is a well-known service and system processor 100 would pass operation requests to connection manager 106 to add terminal equipment T78 to the existing call. Module processor 108-2 responds to the operation requests by reading out the data stored in network map 204 which are associated with the existing call and analyzing this data to determine what must be done to implement the operation requests received from system processor 100.

In this case, port circuit 168 becomes the calling port and a new set of switching network connections must be constructed as follows. Because port circuit 168 is not designated as the root connection of the existing global connection GC5, port circuit 168 cannot add to it. A new global connection (GC7) must be constructed with port circuit 168 as the root. So module processor 108-2 accesses the DELETE PORT logical segment of intermediate control system 201 to disconnect port circuit 168 from its established connections. The execution of the DELETE PORT routine of intermediate control system 201 causes module processor 108-2 to branch to the "delete local connection" segment of hardware control system 202 qualified by the local connection number LC5 of port circuit 168. The execution of this routine generates hardware and connection identifiers which enable time slot interchange control circuit 110 to isolate port circuit 168 from the established global connection GC5, thus preparing the system to establish the new connections.

Module processor 108-2 must now access intermediate control system 201 to get a connection for port circuit 168 and this is accomplished by executing the ADD PORT routine which is qualified by port circuit number (168), time slot interchange circuit number (1). The execution of the ADD PORT routine of intermediate control system 201 returns three actions for module processor 108-2 to implement by means of logical segments of hardware control system 202. The first segment is "create local connection" qualified by time slot interchange circuit number 1, which is a routine to get a local connection (LC3) on time slot interchange circuit 102. The second segment is "get port" which, qualified by the number of port circuit 168, is a routine to assign port circuit 168 to the local connection LC3 just created in time slot interchange circuit 102. The third segment is "attach", which is qualified by the port circuit number 168 and local connection number LC3, is a routine that calls for port circuit 168 and the local connection LC3 in time slot interchange circuit 102 to be connected and assigned a status (which was specified by the user of port circuit 168 and which, if confirmed as available to port circuit 168 is stored elsewhere in connection manager 106). The execution of these logical segments of hardware control system 202 by time slot interchange control circuit 110 returns the hardware and connection identifiers LC3, PT168, TSI1 which identifiers are stored in network map 204 as illustrated in FIG. 7 wherein the entry PT168 is stored in memory location TSI1 LC3.

Pursuing the connection process, module processor 108-2 again accesses the ADD PORT routine, this time qualified by port circuit number 140 and time slot interchange circuit number 0, to reserve a connection in time slot interchange circuit 101 for port circuit 140. The execution of the ADD PORT routine of intermediate control system 201 causes module processor 108-2 to branch to the following four segments of hardware control system 202. The first segment is "create global connection" which routine locates the existing global connection GC5 in time multiplex switch circuit 103 which interconnects time slot interchange circuits 101 and 102 and which global connection is connected to the existing local connection LC2 with port circuit 140. The second segment is "add root" which, accompanied by the local connection number LC3 in time slot interchange circuit 102 and the global connection number GC7 in time multiplex switch 103 (both just assigned), is a routine to refer all subsequent connections to the local connection LC3 (assigned to port circuit 168 in time slot interchange circuit 102) by way of the global connection GC7 which is in time multiplex switch 103. The third segment is the routine "create local connection" which is used again, this time qualified by time slot interchange circuit number 1 to get another local connection LC6 on time slot interchange circuit 102. The fourth segment is the routine "get port" qualified by port circuit number 178 which directs microprocessor 203 to assign port circuit 178 to the local connection LC6 just created in time slot interchange circuit 102. The execution of these routines in hardware control system 202 generates a set of hardware and connection identifiers which is stored in network map 204 as illustrated in FIG. 7 wherein the entry PT178 is stored in memory location TSI1 LC6, GC7 is stored in memory location TS0 and TSI1 LC3, TSI1 LC6 are stored in memory location GC7.

When terminal equipment T78 is taken off-hook, this is sensed by port circuit 178. As before, module processor 108-2 alerts system processor 100, which passes operation requests to connection manager 106 to complete the network connections to interconnect all three pieces of terminal equipment. Module processor 108-2 responds to these operation requests by accessing the ADD PORT routine of intermediate control system 201 to add port circuit 178 to the local connection LC6 just reserved in time slot interchange circuit 102. The execution of the ADD PORT routine of intermediate control system 201 causes module processor 108-2 to branch to the "attach" routine of hardware control system 202 which calls for port circuit 178 and its local connection LC6 to be connected and to be assigned a status (which is stored elsewhere in connection manager 106).

Adding Held Port

Having established a connection with terminal equipment T78 via port circuit 178, assume the user at terminal equipment T68 commands the system to include the original calling party (at terminal equipment T40) in the new global connection GC7 through time multiplex switch 103. This is typically accomplished by the user at terminal equipment T68 flashing the switchhook. This action is detected by port circuit 168, data is relayed to module processor 108-2 and acted upon by system processor 100. System processor 100 sends an operation request to connection manager 106 to add terminal equipment T40 to the existing call. This operation request makes module processor 108-1 access the ADD PORT routine of intermediate control system 201 to reserve a connection for port circuit 140 (that is, for the original calling party). Since the (new) global connection GC7 already exists through time multiplex switch 103, and since the root connection has already been defined, the process of reserving a new connection involves only assigning a new local connection LC1 in time slot interchange circuit 101 to port circuit 140. So the execution of the ADD PORT routine of intermediate control system 201 causes time slot interchange control circuit 110 to branch to the "create local connection" routine of hardware control system 202 qualified by time slot interchange circuit number 0 to get a local connection LC1 in time slot interchange circuit 101 to the new global connection GC7. Time slot interchange control circuit 110 also executes the "get port" routine of hardware control system 202 which assigns port circuit 140 to the local connection LC1 in time slot interchange circuit 101 just created.

Additionally, time slot interchange control circuit 110 calls for removal of the original global GC5 and local connections LC2 by accessing the "delete global connection" routine of hardware control system 202 qualified by global connection number GC5, which deletes the original global connection GC5 to port circuit 140; then accessing the "delete local connection" routine of hardware control system 202 qualified by local connection number LC2, a command to delete the original local connection LC2 to port circuit 140.

Time slot interchange control circuit 110 then executes the "attach" routine of hardware control system 202 which calls for port circuit 140 and its local connection LC1 to be connected and to be assigned a status (which is stored elsewhere in connection manager 106). Execution of these segments of hardware control system 202 generates a set of hardware and connection identifiers which are to be deleted. Time slot interchange control circuit 110 responds by removing all the identified entries from network map 204. This would be illustrated by deleting all the entries in FIG. 7 delimited by parenthesis. Thus, the connection is made between port circuits 140, 168 and 178.

Interswitch Call

A different procedure is followed by connection manager 106 when a piece of terminal equipment that is on the same time slot interchanger as the root port is to be connected to an existing conversation. For example, in reply to an operation request from system processor 100 to module processor 108-2 to get a connection from the existing conference to port circuit 160, module processor 108-2 would simply access the "hang" segment of intermediate control system 202 to connect port circuit 160 to the conference by way of the root connection to port circuit 168. When the terminal equipment at port circuit 160 is taken off-hook, it is connected directly to port circuit 168 and thereby to the conference.

It is equally uncomplicated to delete such a connection. When the handset at port terminal equipment T78 is replaced, system processor 100 requests that port circuit 178 be disconnected. This causes module processor 108-2 to access the "unhang" segment of intermediate control system 201 which disconnects port circuit 178 from the conference.

Removal of the Originating Port

The root connection may be disconnected from a conference. When the user at terminal equipment T68 goes on-hook in the example conference, module processor 108-2 disconnects port circuit 168 via the DELETE routine. The execution of the DELETE routine of intermediate control system 201 returns three actions for module processor 108-2 to implement by means of logical segments of hardware control system 202: The first segment is an "unroot" routine which removes the root assignment from the global connection GC7 (so if any attempt is made to add to the global connection, the calling port will have to be established as the root connection as was port circuit 168 in the example given). The second segment "detach port" is a routine which removes port circuit 168 from its local connection LC3. The third segment "delete local connection" is a routine which removes the local connection LC3 (formerly used for port circuit 168) assignment from the global connection GC7.

Listen Only Ports

Similarly, ports may be added to connections in a "listen only" mode. The time slot interchange control circuits 110, 120 (disclosed in the above-cited reference) are processor-based and can perform mathematical operations on the data (PCM-encoded voice packets) received from the port circuits or the time multiplex switch 103. In particular, in performing a summing operation for a conference call, time slot interchange control circuits 110, 120 can delete any data packets received from an identified "listen only" port or "listen only" global connection. Thus, the programmer can create feature software for system processor 100 and network control software for the module processors 108-1, 108-2 to implement any desired conference configuration given the flexibility and capabilities of the network control structure disclosed herein.

Thus, this network control arrangement contains a number of independent processor-controlled modules, each of which operates on a predetermined layer of the call processing software. These modules treat the digital call signals as data to be transferred or operated upon, and communicate among themselves by generating interrupts and passing messages back and forth via the busses that interconnect these modules. A particular module can, therefore, be modified without affecting the rest of the system if the message format between the changed module and the rest of the system does not change. This provides a significant amount of flexibility to the system designed to change modules without having a significant system impact. In addition, the software written for each of the layers of the system is "portable" in that it can be used in any similar system due to its modular nature.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. In a switching system which serves a plurality of communication circuits (T40-T78) each of which is connected by an associated one of a plurality of port circuits (140-178) to a switching network (101-103) of said switching system, which switching network (101-103) establishes communication connections among said port circuits (140-178) by controllably exchanging digital call signals among said port circuits (140-178), a method of controlling said switching network (101-103) comprising the steps of:
   monitoring said port circuits (140-178) for service requests;
   creating a plurality of functionally equivalent sets of response operations to satisfy said service requests;
   selecting one of said sets of response operations;
   converting said selected set of response operations into a network map of circuit interconnections; and
   controlling said switching network (101-103) to establish said communication connections based on said network map.

2. The system of claim 1 wherein said step of creating includes the step of:
   listing all the requested digital call signal exchanges among the port circuits associated with a communication connection.

3. The system of claim 2 wherein the step of converting includes the step of:
   executing said list of operations to define the circuit resources required to implement said digital call signal exchanges.

4. The system of claim 2 wherein the step of converting further includes the step of:
   allocating particular circuit elements to satisfy said resource definitions; and
   generating a network map illustrating the interconnection of said particular circuit elements.

5. The system of claim 3 wherein said switching network (101–103) includes a time slot interchange circuit (101) having a time slot interchanger (400), the step of allocating includes the step of:

instructing said time slot interchanger (400) to perform mathematical operations on said digital call signals.

6. The system of claim 4 wherein the step of allocating further includes the step of:

establishing undirectional digital call signal exchanges.

7. In a switching system which serves a plurality of communication circuits (T40–T78), each of which is connected by an associated one of a plurality of port circuits (140–178) to a switching network (101–103) of said switching system, which switching network establishes communication connections among said port circuits (140–178) by controllably exchanging digital call signals among said port circuits (140–178), a switching network control system comprising:

system processor means (100) responsive to service requests from said port circuits (140–178) for creating a plurality of sets of response operations to implement said service requests; and connection manager means (106) responsive to a select one of said sets of response operations for converting said select set of response operations into a network map of circuit interconnections to implement said service requests;

operations into a network map of circuit interconnections to implement said service requests;

wherein said switching network (101–103) is responsive to said network map of circuit interconnections for distributing digital call signals among said port circuits as defined by said network map.

8. The system of claim 6 wherein said connection manages means (106) includes:

intermediate control system means (201) responsive to said select set of operations response for defining the circuit resources required to implement said service request.

9. The system of claim 7 wherein said connection manager means (106) further includes:

hardware control system means (202) responsive to said resource definitions for allocating particular circuit elements to satisfy said resource definitions.

10. The system of claim 8 wherein said connection manager means (106) further includes:

memory map means (204) for storing a list of said particular circuit elements.

* * * * *